(12) United States Patent
Tsuji (10) Patent No.: US 9,335,448 B2
(45) Date of Patent: May 10, 2016

(54) LIQUID LENS MAXIMIZING THE ELASTIC STRAIN ENERGY

(71) Applicant: CANON KABUSHIKI KAISHA, Tokyo (JP)

(72) Inventor: Minoru Tsuji, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/385,227

(22) PCT Filed: Mar. 29, 2013

(86) PCT No.: PCT/JP2013/060416
§ 371 (c)(1),
(2) Date: Sep. 15, 2014

(87) PCT Pub. No.: WO2013/151148
PCT Pub. Date: Oct. 10, 2013

(65) Prior Publication Data
US 2015/0043085 A1    Feb. 12, 2015

(30) Foreign Application Priority Data

Apr. 4, 2012    (JP) .................................. 2012 085961

(51) Int. Cl.
*G02B 1/06*    (2006.01)
*G02B 3/12*    (2006.01)
*G02B 3/14*    (2006.01)
*G02B 26/00*    (2006.01)

(52) U.S. Cl.
CPC ................ *G02B 3/14* (2013.01); *G02B 26/005* (2013.01)

(58) Field of Classification Search
CPC ...... G02B 3/14; G02B 26/004; G02B 26/005; G02B 1/041; G02B 3/12; G02B 5/20; F24J 2002/5458; F24J 2/1052; F24J 2/5264; F24J 2/5406
USPC .................................................. 359/665, 666
See application file for complete search history.

(56) References Cited

U.S. PATENT DOCUMENTS

| | | | | |
|---|---|---|---|---|
| 4,783,155 | A | * 11/1988 | Imataki | G02B 3/14 359/666 |
| 2012/0037820 | A1 | 2/2012 | Komi | |
| 2012/0327286 | A1 | 12/2012 | Imura | |

FOREIGN PATENT DOCUMENTS

| | | |
|---|---|---|
| JP | 01225901 A | 9/1989 |
| JP | 2008180884 A | 8/2008 |
| WO | 2004102253 A1 | 11/2004 |

OTHER PUBLICATIONS

International Preliminary Report on Patentability issued in PCT/JP2013/060416 mailed Oct. 16, 2014.

(Continued)

*Primary Examiner* — Alicia M Harrington
(74) *Attorney, Agent, or Firm* — Rossi, Kimms & McDowell LLP (57) ABSTRACT

Liquid lens (100) including two liquids (104, 105) being adjacent to each other in a container (101, 102, 103) with a flexible member (106) interposed between them wherein at least a part of the flexible member (106) functions as refractive surface and characterized in that the elastic strain energy per unit area Y [N/m] of the flexible member satisfies the inequality $\gamma \geq 5.16 \times 10^5 \times \Delta\rho \times \alpha^{-1} \times \chi^{3.4}$, where •$\Delta\rho$ [kg/m 3] is the density difference between the two liquids arranged adjacent to the flexible member; •$\alpha$ [$\lambda$] is the surface accuracy of the refractive surface; and •$\phi$ [m] is the inner diameter of the liquid lens.

6 Claims, 3 Drawing Sheets

(56) References Cited

OTHER PUBLICATIONS

International Search Report dated May 23, 2013 issued in corresponding International Application No. PCT/JP2013/060416.

Written Opinion of the International Authority dated May 23, 2013 issued in corresponding International Application No. PCT/JP2013/060416.

* cited by examiner

LIQUID LENS MAXIMIZING THE ELASTIC STRAIN ENERGY

TECHNICAL FIELD

This invention relates to a liquid lens in which a flexible member operates as refractive surface, to a method of manufacturing the same and also to a camera.

BACKGROUND ART

In recent years, research and development efforts have been paid on liquid lenses as a form of lens having variable refracting power. Liquid lenses can be classified into several types and a type of liquid lens whose refracting power can be changed by changing the curvature of the flexible member that is arranged adjacent to liquid in the liquid lens is known. At present, liquid lenses of this type are expected to be applicable to various optical systems because they are highly responsive and resistant against disturbances such as vibrations. PTL 1 discloses a technique of reducing the density difference between the two different liquids arranged adjacent to a flexible member for the purpose of making the refractive surface of the flexible member close to a spherical surface.

CITATION LIST

Patent Literature

PTL 1: Japanese Patent Application Laid-Open No. H01-225901

SUMMARY OF INVENTION

Technical Problem

The inventor of the present invention closely examined the disclosed technique and found that the technique disclosed in PTL 1 can reduce the density difference between the two different liquids only to a certain extent but not extremely and satisfactorily. If the density difference is to be reduced extremely small, for example to less than, 1 kg/m$^3$ and the temperature of the operating environment of such a liquid lens changes by about ±10° C., the density difference would become to be 1 kg/m$^3$ or greater depending on the materials of the liquids.

Solution to Problem

An object of the present invention is to provide a liquid lens having a flexible member whose shape can be held to a desired surface accuracy level by controlling the inner diameter of the liquid lens and the elastic strain energy per unit area of the flexible member that provides a refractive surface without extremely reducing the density difference between the two liquids arranged to the flexible member, a method of manufacturing such a liquid lens and a camera including such a lens. More particularly, the object of the present invention is to provide a liquid lens whose optical decenter can be reduced and that can be made to represent a preferable spherical surface accuracy by controlling the elastic strain energy and other factors, a method of manufacturing such a liquid lens and a camera including such a liquid lens. The spherical surface accuracy of a liquid lens is the largest value of the displacement of the liquid lens in the direction parallel to the optical axis of the liquid lens that arises when its refractive surface is made to fit a spherical surface by means of a method of least squares.

According to the present invention, the above object is achieved by providing a liquid lens including two or more liquids arranged adjacent to each other in a container for containing the liquids with a flexible member interposed between them, at least a part of the flexible member functioning as refractive surface;

the elastic strain energy per unit area γ[N/m] of the flexible member satisfying the requirement of formula (1) represented below;

$$\gamma \geq 5.16 \times 10^5 \times \Delta\rho \times \alpha^{-1} \times \phi^{3.4} \qquad \text{formula (1),}$$

where
Δρ [kg/m$^3$] is the density difference between the two liquids arranged adjacent to the flexible member;
α[λ] is the surface accuracy of the refractive surface; and
φ[m] is the inner diameter of the liquid lens.

According to the present invention, there is also provided a method of manufacturing a liquid lens including two or more liquids arranged adjacent to each other with a flexible member interposed between them, at least a part of the flexible member functioning as refractive surface;

the method including:
a step of determining the inner diameter φ[m] of the liquid lens and the surface accuracy α[λ] of the refractive surface;
a step of determining the density difference Δρ[kg/m$^3$] between the two liquids to be arranged adjacent to the flexible member and the elastic strain energy per unit area γ[N/m] of the flexible member on the basis of the determined inner diameter φ, the determined surface accuracy α and the formula (1);
a step of preparing a container having the above determined inner diameter φ; and
a step of arranging the two or more liquids and the flexible member in the container.

In a liquid lens according to the present invention, three parameters (Δρ, γ, φ) including the elastic strain energy per unit area γ of the flexible member and the inner diameter φ of the liquid lens in addition to the density difference Δρ between the first liquid and the second liquid that are arranged adjacent to each other are used as parameters that relate to the surface accuracy of the refractive surface and the requirement of the formula (1) to be satisfied for a liquid lens is defined by incorporating the three parameters into the formula. For this reason, a desired surface accuracy level can be achieved without extremely reducing the density difference Δρ between the first liquid and the second liquid by changing the values of the two parameters (γ, φ). Additionally, a method of manufacturing a liquid lens according to the present invention can manufacture a liquid lens representing a desired surface accuracy level without extremely reducing the density difference between the two liquids arranged adjacent to a flexible member.

Further features of the present invention will become apparent from the following description of exemplary embodiments with reference to the attached drawings.

DESCRIPTION OF EMBODIMENTS

A liquid lens according to the present invention includes two or more liquids arranged adjacent to each other in a container for containing the liquids with a flexible member interposed between them, at least a part of the flexible member functioning as refractive surface and the liquid lens is characterized in that the liquid lens satisfies the requirement of the formula (1) represented above. In the above formula (1), $\lambda$ is the wavelength of light to be made to pass through the lens. As the wavelength of light to be made to pass through the lens varies, the absolute quantity of the required surface accuracy varies as will be seen from the above formula in which the surface accuracy of the refractive surface is expressed by $\alpha[\lambda]$. For example, the absolute quantity of the required surface accuracy will be $\alpha \times 800$ nm if the wavelength of light to be made to pass through the lens is 800 nm, whereas the absolute quantity of the required surface accuracy will be $\alpha \times 400$ nm if the wavelength of light to be made to pass through the lens is 400 nm. Additionally, in a liquid lens according to the present invention, the elastic strain energy $\gamma$ varies as a function of the shape (or the strain) of the flexible member. Therefore, if a value that satisfies the requirement of the above formula (1) is selected for the elastic strain energy $\gamma$ of the lens, there can be a situation where the flexible member is deformed and consequently the elastic strain energy $\gamma$ is decreased so that the requirement of the above formula (1) may no longer be satisfied. For this reason, for a liquid lens having a deformable flexible member according to the present invention to provide the advantages of the invention regardless of the state of deformation of the flexible member, a relatively large value needs to be selected for the elastic strain energy $\gamma$ in advance so that the elastic strain energy $\gamma$ may satisfy the requirement of the above formula (1) if the flexible member is deformed. Additionally, there can be a situation where the requirement of the above formula (1) is no longer satisfied because the temperature changes to by turn change $\Delta \rho$ (there can be an instance where $\Delta \rho$ is greater than 1 kg/m³). Therefore, for a liquid lens whose temperature being able to change according to the present invention to provide the advantages of the invention regardless of the temperature of the liquid lens, a relatively large value needs to be selected for the elastic strain energy $\gamma$ in advance so that the elastic strain energy $\gamma$ may satisfy the requirement of the above formula (1) after a change of temperature. With the above-described arrangement, it will be obvious that the above requirement is satisfied when a liquid lens according to the present invention includes two liquids. If, for example, a liquid lens according to the present invention includes three liquids, the liquid lens is made to satisfy the requirement of the above formula (1) by forming the liquid lens with a container for containing liquids, a first liquid, a first flexible member and a second liquid and by forming the liquid lens with a container for containing liquids, a second liquid, a second flexible member and a third liquid.

Now, embodiments of the present invention will be described below by referring to the drawings.

EXAMPLE 1

Figure 1:
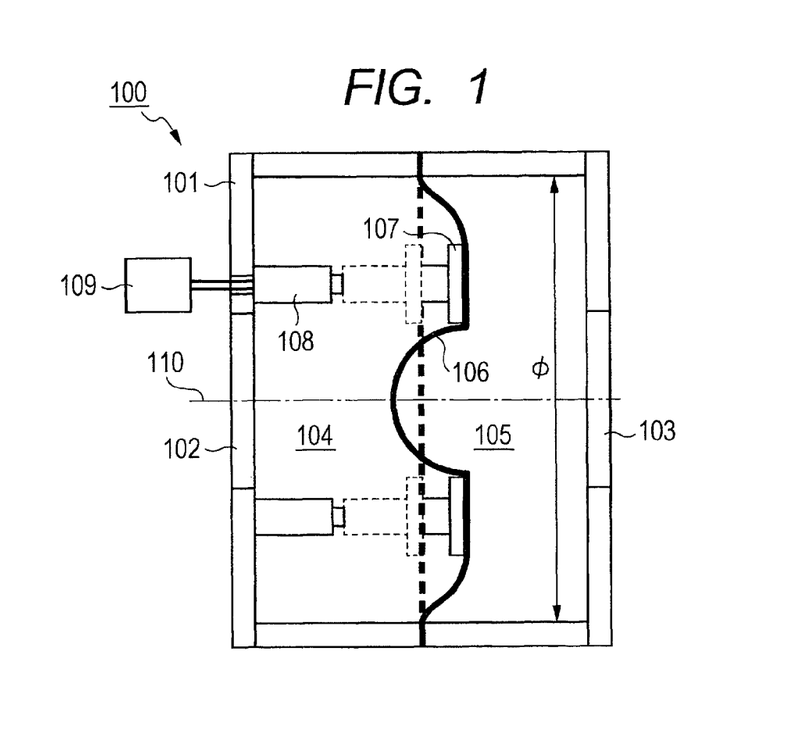
FIG. 1 is a schematic cross-sectional view of a liquid lens according to the present invention and illustrated as an example.

FIG. 1 is a schematic cross-sectional view of a liquid lens 100 according to the present invention and illustrated as an example. This cross-sectional view is taken along a plane that includes the center axis of the cylindrical container of the liquid lens (the optical axis 110 of the liquid lens). Referring to FIG. 1, a first liquid 104 and a second liquid 105 are contained in the cylindrical container and arranged adjacent to each other with a flexible member 106 interposed between them. The cylindrical container is formed by bonding closure members 102 and 103 that transmit light to the opposite ends of a cylindrical member 101. Both the first liquid 104 and the second liquid 105 transmit light and have respective refractive indexes that are different from each other. For example, pure water and silicon oil may be used for the first liquid 104 and the second liquid 105.

The flexible member 106 is bonded at the ends thereof to the cylindrical member 101. When the flexible member 106 is pressed by a pressing member 107 and partly deformed (from a state indicated by a dotted line to a state indicated by a solid line in FIG. 1), only a central portion of the flexible member is deformed to change the position and the shape thereof but terminal portions thereof remain unchanged in terms of position and shape. Of the flexible member 106, the portion located at the side of the optical axis 110 relative to the pressing member 107 functions as the refractive surface of the liquid lens 100. As the refractive surface is deformed, the optical power at the refractive surface changes. The flexible member 106 can be formed by using a material that transmits light such as silicon rubber thin film. The pressing member 107 has a cylindrical profile and entirely surrounds the optical axis 110 so as to be held in contact with the flexible member 106 at the circular end surface thereof. As the cylindrical pressing member 107 displaces the portion of the flexible member 106 that is held in contact with the pressing member 107 in a direction parallel to the optical axis 110, a central portion of the flexible member 106 is deformed to represent a spherical surface as illustrated in the solid line in FIG. 1. Note that, with the above-described arrangement, the inner diameter $\phi$ of the liquid lens is defined not by the diameter of the cylindrical pressing member 107 but by the largest inner diameter of the container containing the first liquid 104 and the second liquid 105 (or the largest outer diameter of the first liquid 104 and that of the second liquid 105).

As drive member 108 receives a signal from a drive apparatus 109, the drive member 108 displaces the pressing member 107 in a direction parallel to the optical axis 110 and hence displaces a portion of the flexible member 106 located near the pressing member 107 also in a direction parallel to the optical axis. Then, as a result, the profile of a spherical surface of the central portion (refractive surface) of the flexible member 106 is changed and the optical power thereof changes. An ultrasonic motor or a voice coil motor may be used for the drive member 108 and a stabilized power supply may be used for the drive apparatus 109. Although not-illustrated in FIG. 1, seal members are arranged at appropriate positions in order to prevent the first liquid 104 and the second liquid 105 from leaking out of the cylindrical member 101 and also to prevent them from getting into the inside of the drive member 108 to adversely affect the operation of the drive member 108. Generally speaking, the surface accuracy of a refractive surface can effectively be held to a high level by reducing the density difference between the first liquid 104 and the second liquid 105. If, for example, the inner diameter of the liquid lens 100 ($\phi$ in FIG. 1) is 30 mm and the elastic strain energy per unit area of the flexible member 106 is 1.7 N/m, a density difference of not greater than 10 kg/m$^3$ is sufficient to maintain a surface accuracy of 20$\lambda$ (1$\lambda$=632.8 nm). A higher surface accuracy can be maintained by further reducing the density difference between the first liquid 104 and the second liquid 105, although the density difference cannot be made extremely small without difficulty. For example, a density difference of not greater than 0.5 kg/m$^3$ is sufficient to maintain a surface accuracy of 1$\lambda$ for the above-described liquid lens. However, if the temperature of the operating environment of such a liquid lens changes by about ±5° C., the density difference would become to be 0.5 kg/m$^3$ or greater depending on the materials of the liquids. Then, the above-described level of surface accuracy can no longer be maintained.

For this reason, according to the present invention and for this embodiment, three parameters including the elastic strain energy per unit area $\gamma$ of the flexible member 106 and the inner diameter $\phi$ of the liquid lens 100 in addition to the density difference $\Delta\rho$ between the first liquid 104 and the second liquid 105 are used as parameters that relate to the surface accuracy of the refractive surface and the requirement of the formula (1) to be satisfied for a liquid lens is defined by incorporating the three parameters into the formula. The formula (1) is represented below again for reiteration.

$$\gamma \geq 5.16 \times 10^5 \times \Delta\rho \times \alpha^{-1} \times \phi^{3.4} \qquad \text{formula (1)}$$

As described above for the formula (1), the unit of $\Delta\rho$ is [kg/m$^3$] and the unit of $\gamma$ is [N/m], while the unit of $\alpha$ is [$\lambda$] and the unit of $\phi$ is [m]. $\phi$ is defined as "the largest diameter of the part of the container containing the two liquids 104 and 105 that are arranged adjacent to the flexible member 106". Thus, a desired surface accuracy level can be achieved by appropriately selecting the values of the two parameters ($\gamma$, $\phi$) without extremely reducing the density difference between the first liquid 104 and the second liquid 105.

Figure 2:
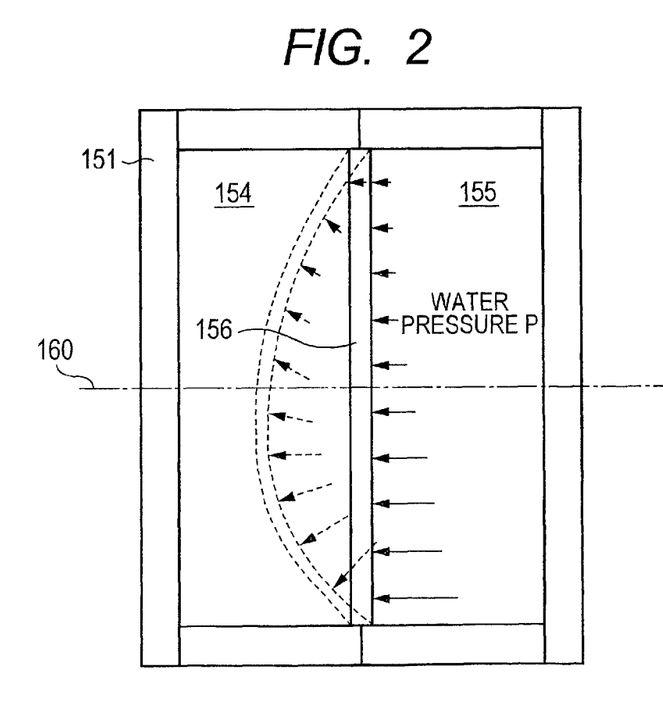
FIG. 2 is a schematic illustration for describing the means for solving the problem to be solved by the present invention.

Now, the reason why 1, −1 and 3.4 are selected respectively as multipliers for $\Delta\rho$, $\alpha$ and $\phi$ in the formula (1) will be described below with the use of FIG. 2. FIG. 2 is a schematic cross-sectional view of cylindrical container 151 taken along a plane that includes the center axis 160. The inside of the cylindrical container 151 is partitioned by a flexible member 156 and a first liquid 154 and a second liquid 155 are arranged adjacent to the flexible member 156. The flexible member 156 is subjected to pressures applied respectively as proportionate to depth by the first liquid 154 and the second liquid 155 (when the liquid is water, the pressure is a water pressure). The pressures represent a same value when the density of the first liquid 154 and the density of the second liquid 155 are equal to each other. The pressures represent different values, on the other hand, when the density of the first liquid 154 and the density of the second liquid 155 are different from each other.

FIG. 2 illustrates an instance where the density of the second liquid 155 is greater than the density of the first liquid 154. The arrows in FIG. 2 indicates the pressure applied to the flexible member 156 by the second liquid 155 less the pressure applied to the flexible member 156 by the first liquid 154. Consequently, as the flexible member 156 is subjected to pressure indicated by arrows in FIG. 2, the flexible member 156 is deformed from the state indicated by solid lines to the state indicated by the dotted lines. Since the pressure is not symmetric relative to the center axis 160, the flexible member 156 represents an aspheric profile as indicated by dotted lines after the deformation. As illustrated in FIG. 2, the flexible member 156 is subjected to pressure in a direction that is perpendicular to the surfaces of the flexible member 156.

Assume here that the flexible member 156 is subjected to pressure in a direction parallel to the center axis 160, then the displacement Z of the flexible member 156 is proportional to the first power of the pressure applied to the flexible member 156 and to the third power of the diameter of the flexible member 156 from an analysis based of mechanics of materials. Since the pressure applied to the flexible member 156 is proportional to the first power of the diameter of the flexible member 156, consequently, the displacement Z of the flexible member 156 at an arbitrary portion thereof is proportional to the fourth power of the diameter of the flexible member 156. On the other hand, when the flexible member 156 is subjected to pressure in a direction perpendicular to the surfaces of the flexible member 156, and the pressure is decomposed into a component that is parallel to the center axis 160, the pressure (component force) in the direction parallel to the center axis 160 is lower than the pressure to which the flexible member 156 is subjected in a direction parallel to the center axis 160. Besides, as the diameter of the flexible member 156 increases, the displacement Z thereof increases. Then, the component force parallel to the center axis 160 decreases. For this reason, the displacement Z of the flexible member 156 is proportional not to the fourth power of the diameter of the flexible member 156 but to a value smaller than the fourth power. The inventor of the present invention found as a result of numerical analysis (simulations) that the displacement Z of the flexible member 156 is proportional approximately to the 3.4th power of the diameter of the flexible member 156.

On the basis of that the flexible member 156 is subjected to pressure that is proportional to the density difference $\Delta\rho$ between the first liquid 154 and the second liquid 155 in addition to the above-described finding, formula (2) represented below holds true for the relationship among the displacement Z of the flexible member 156, $\Delta\rho$ and the diameter $\phi$ of the flexible member 156.

$$Z \propto \Delta\rho \times \phi^{3.4} \qquad \text{formula (2)}$$

The inventor of the present invention also found that, when the displacement Z of the flexible member 156 is made to fit to a spherical surface by means of a method of least squares, the largest value $\Delta Z$ of the displacement of the flexible member 156 in a direction parallel to the center axis 160 of the cylindrical member 151 represents a proportional relationship relative to the displacement Z of the flexible member 156. Thus, the above formula (2) can be replaced by formula (3) represented below.

$$\Delta Z \propto \Delta\rho \times \phi^{3.4} \qquad \text{formula (3)}$$

The value obtained by normalizing $\Delta Z$ with 632.8 nm, which is the wavelength $\lambda$ of He—Ne laser beam that are being popularly employed for surface accuracy measurements, is the surface accuracy $\alpha$[$\lambda$] in the formula (1). Thus, the above formula (3) can be replaced by formula (4) represented below.

$$\alpha \propto \Delta\rho \times \phi^{3.4} \qquad \text{formula (4)}$$

As a result of determining the relationship between the elastic strain energy per unit area $\gamma$ and the surface accuracy $\alpha$ of the flexible member 156 by numerical calculations under the condition that $\Delta\rho$ and $\phi$ are invariable, the inventor of the present invention found that they represent a relationship of being inversely proportional to each other. Thus, the above formula (4) can be rewritten so as to read as formula (5) represented below.

$$\gamma \times \alpha \propto \Delta\rho \times \phi^{3.4} \leftrightarrow \gamma \propto \Delta\rho \times \alpha^{-1} \times \phi^{3.4} \qquad \text{formula (5)}$$

For the above-described reason, 1, −1 and 3.4 are selected respectively as multipliers for Δρ, α and ϕ in the formula (1).

Now, exemplar liquid lenses of this embodiment will be described below. The first exemplar liquid lens 100 of this embodiment has an inner diameter (ϕ in FIG. 1) of 30 mm, which is same as the inner diameter of the above-described liquid lens and represents a density difference of 2 kg/m$^3$. For the liquid lens 100 to represent a surface accuracy of not greater than 1λ, a value not less than 6.86 N/m is sufficient for the elastic strain energy per unit area of the flexible member 106 on the basis of the formula (1). Thus, the elastic strain energy per unit area of the flexible member 106 of this exemplar liquid lens 100 is made to be not less than 6.86 N/m. Then, as a result, a desired surface accuracy of not greater than 1λ can be realized for such a large aperture lens of ϕ30 mm without reducing the density difference to not greater than 1 kg/m$^3$.

The elastic strain energy per unit area of the flexible member 106 can be raised effectively by raising the longitudinal elastic modulus of the flexible member 106, by raising the thickness of the flexible member 106 in the direction of the optical axis 110 and/or by raising the strain of the flexible member 106. The strain of an object is expressed by the value obtained by dividing the increase or decrease in the length of the object by the original length. Thus, for the purpose of the present invention, the strain is the value obtained by dividing the increase or decrease in the thickness of the flexible member by the original thickness of the flexible member. If, for example, the longitudinal elastic modulus of the flexible member 106 is 0.1 MPa and the elastic strain energy per unit area of the flexible member 106 is 1.7 N/m, the elastic strain energy per unit area of the flexible member 106 can be raised to not less than 6.86 N/m by replacing the flexible member with a flexible member of a material whose longitudinal elastic modulus is not less than 0.5 MPa (without changing the thickness in the direction of the optical axis 110 and the value of the strain). If the thickness of the flexible member 106 is 5 μm in the direction of the optical axis 110 and the elastic strain energy per unit area of the flexible member 106 is 1.7 N/m, the elastic strain energy per unit area of the flexible member 106 can be raised to not less than 6.86 N/m by replacing the flexible member with a flexible member having a thickness not less than 25 μm (without changing the longitudinal elastic modulus and the value of the strain). If the values of the strain of the flexible member 106 is 0.1 and the elastic strain energy per unit area of the flexible member 106 is 1.7 N/m, the elastic strain energy per unit area of the flexible member 106 can be raised to not less than 6.86 N/m by stretching the flexible member to make the value of the strain not less than 0.21 (without changing the longitudinal elastic modulus and the thickness in the direction of the optical axis 110).

The elastic strain energy per unit area of the flexible member 106 of the second exemplar liquid lens 100 of this embodiment is 1.7 N/m, which is same as that of the above-described lens, and the density difference thereof is 2 kg/m$^3$. An inner diameter (ϕ in FIG. 1) of not greater than 24.4 mm is sufficient for this liquid lens 100 to have a surface accuracy of not greater than 1λ on the basis of the formula (1). By reducing the inner diameter of the liquid lens 100, this exemplar liquid lens 100 can be made to have a desired surface accuracy of not greater than 1λ without reducing the density difference to not greater than 1 kg/m$^3$, as that of the above-described lens.

The liquid lens of this embodiment can be made to represent various surface accuracy levels by configuring the lens so as to satisfy the requirement of the formula (1). Then, as a result, the liquid lens can be made to find various applications.

Thus, for example, a liquid lens having a surface accuracy value of not greater than 10λ can be used for varifocal eyeglasses. A liquid lens having a surface accuracy value of not greater than 5λ can be used for web cameras, car mounted cameras and mobile phone cameras. A liquid lens having a surface accuracy value of not greater than 2λ finds applications in the field of digital cameras and also in the field of digital single-lens reflex cameras. Finally, a liquid lens having a surface accuracy value of not greater than 1λ finds applications in the field of high precision digital cameras and also in the field of high precision digital single-lens reflex cameras.

EXAMPLE 2

Figure 3:
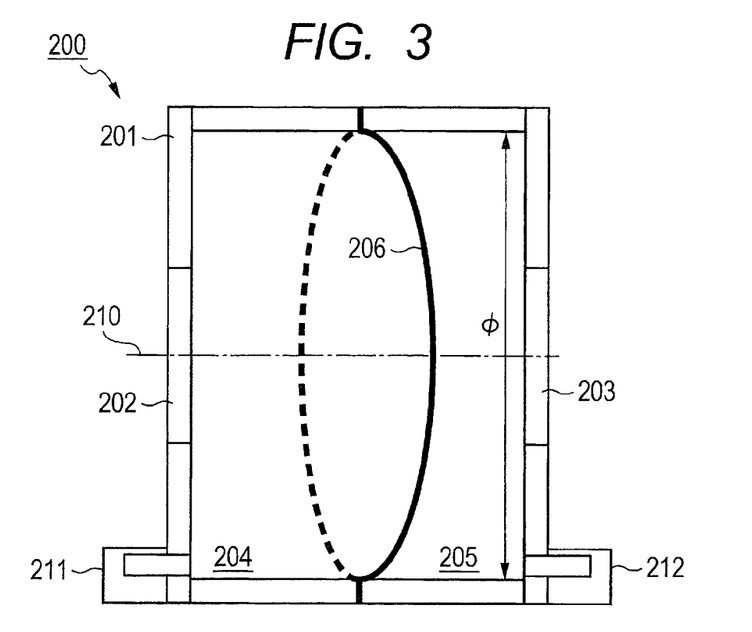
FIG. 3 is a schematic cross-sectional view of a liquid lens according to the present invention and illustrated as another example.

FIG. 3 is a schematic illustration of another exemplar liquid lens 200 according to the present invention, illustrating the liquid lens in cross section taken along a plane that includes the center axis of the cylindrical container of the liquid lens (the optical axis 210 of the liquid lens). Referring to FIG. 3, a cylindrical container formed by bonding light-transmitting closure members 202 and 203 to the opposite ends of a cylindrical member 201 contains first liquid 204 and a second liquid 205, which are arranged adjacent to each other with a flexible member 206 interposed between them. Both the first liquid 204 and the second liquid 205 transmit light and represent respective refractive indexes that are different from each other. For example, pure water and silicon oil may be used for the first liquid 204 and the second liquid 205. The end of the flexible member 206 is bonded to the cylindrical member 201. Of the flexible member 206, the portion that is not bonded to the cylindrical member 201 operates as refractive surface of the liquid lens 200.

Pumps 211 and 212 are linked respectively to the first liquid 204 and the second liquid 205 in the cylindrical container by way of flow paths. The Pumps 211 and 212 are so arranged that they are actuated in an interlocked manner. As the pump 211 feeds the first liquid 204 into the cylindrical container, the pump 212 sucks up the second liquid 205 from the inside of the cylindrical container. As the pump 211 feeds the first liquid 204 into the cylindrical container and the pump 212 sucks up the second liquid 205 from the inside of the cylindrical container, the volume of the first liquid 204 in the cylindrical container increases to change the contour of the refractive surface of the flexible member 206 from the one indicated by the dotted line in FIG. 3 to one indicated by the solid line. As the refractive surface is deformed in this way, the optical power at the refractive surface also changes. The flexible member 106 transmits light and may be formed by using, for example, silicon rubber thin film. Various techniques other than the use of pumps 211 and 212 are available to deform the refractive surface and any of such techniques may be used to provide the advantages of the present invention (and secure a desired degree of surface accuracy).

Figure 4:
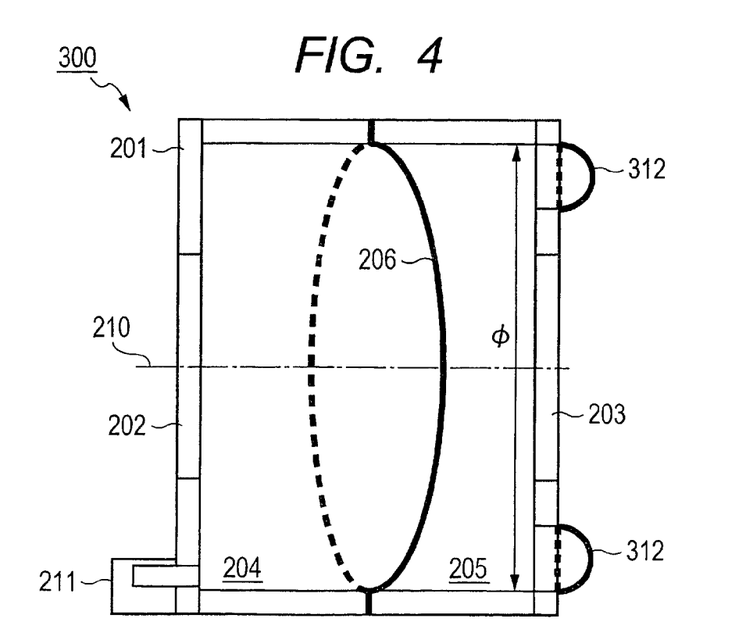
FIG. 4 is a schematic cross-sectional view of a liquid lens according to the present invention and illustrated as still another example.

FIG. 4 is a schematic illustration of a liquid lens 300 obtained by partly modifying the configuration of the liquid lens 200 of this embodiment, illustrating a cross-sectional view taken along a plane that includes the center axis of the cylindrical container (the optical axis 210 of the liquid lens). In the liquid lens 300 of FIG. 4, the pump 212 of the liquid lens 200 is replaced by a flexible member 312. With this arrangement, when the pump 211 feeds the first liquid 204 into the inside of the cylindrical container, the second liquid 205 in the vicinity of the flexible member 312 is driven out from the cylindrical container, expanding the flexible member 312 in the direction of moving away from the cylindrical container. Thus, in the liquid lens 300, the flexible member 312 takes the role of driving out the second liquid 205 from the inside of the cylindrical container. In the instance of the liquid lens 300, unlike the liquid lens 200, the pump 211 and the flexible member 312 do not need to be actuated in an interlocked manner and hence the liquid lens 300 provides a good operability.

Beside the above-described techniques, techniques for deforming a refractive surface include one with which the flow path of the first liquid 204 and the flow path of the second liquid 205 of the liquid lens 200 illustrated in FIG. 3 are led to a single pump and this single pump is driven to flow the first liquid 204 and the second liquid 205 into/out of the cylindrical container. Although not-illustrated in FIGS. 3 and 4, seal members are arranged at appropriate positions in order to prevent the first liquid 204 and the second liquid 205 from leaking out of the cylindrical member.

Figure 5:
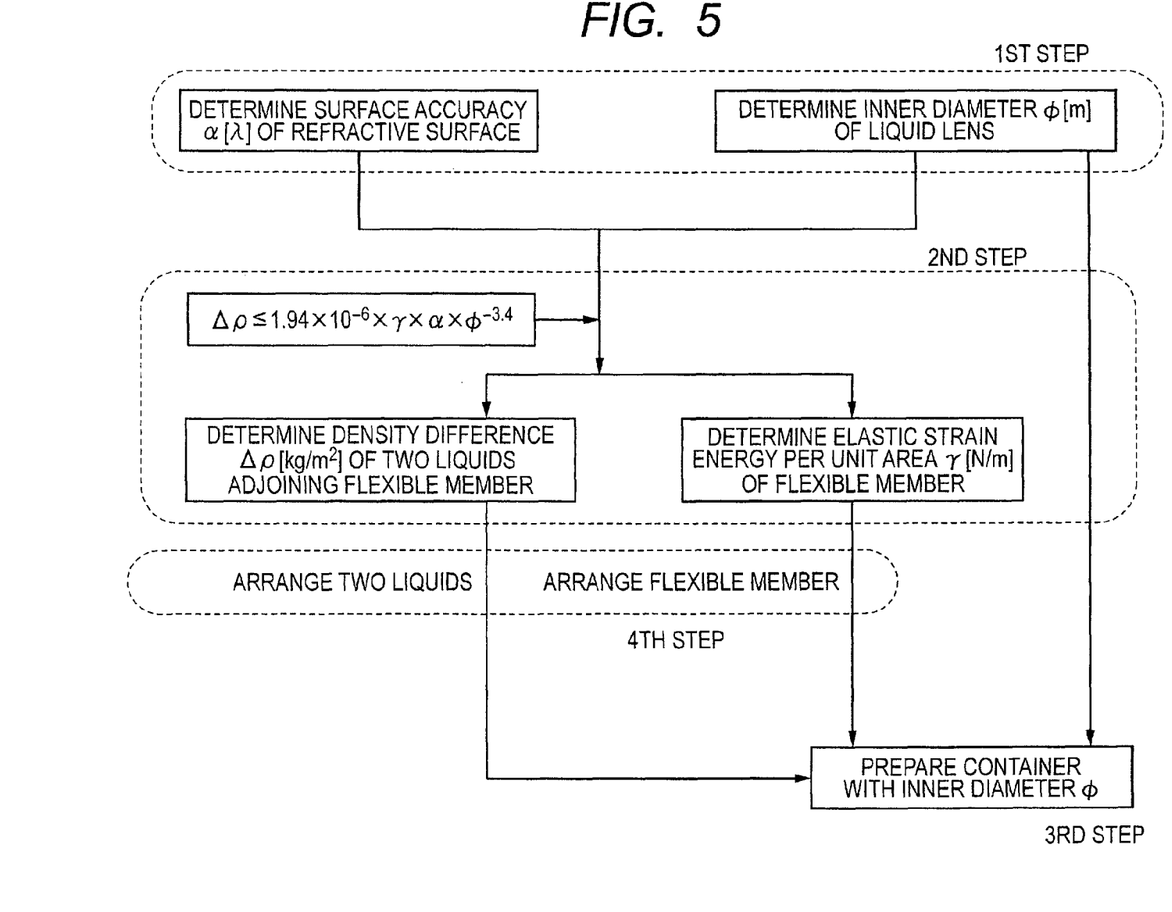
FIG. 5 is a schematic illustration of the steps of the method of manufacturing a liquid lens according to the present invention.

FIG. 5 is a schematic illustration of the steps of the method of manufacturing a liquid lens 200 and a liquid lens 300 and illustrated respectively in FIGS. 3 and 4. Now, the method of manufacturing a liquid lens according to the present invention will be described below by referring to FIG. 5. The manufacturing method of the present invention includes the first through fourth steps as illustrated in FIG. 5. Firstly, in the first step, the surface accuracy $\alpha$ of the refractive surface that is required to the liquid lens 200 or 300 and the inner diameter $\phi$ of the liquid lens 200 or 300, whichever appropriate, are determined. These values are determined on the basis of the optical and mechanical design values of the liquid lens.

Then, in the second step, the density difference $\Delta\rho$ between the liquids 204 and 205 arranged adjacent to the flexible member 206 and the elastic strain energy per unit area $\gamma$ of the flexible member 206 are determined on the basis of the surface accuracy $\alpha$ and the inner diameter $\phi$ of the liquid lens 200 or 300 that are determined in the above step and by using the above formula (1). Then, in the third step, a container having an inner diameter $\phi$ for containing liquid is prepared. The expression of inner diameter as used herein refers to the largest inner diameter of the part of the container for containing the first liquid 204 and the second liquid 205. In FIGS. 3 and 4, the container is formed by combining the cylindrical member 201, the closure members 202 and 203, the pumps 211 and 212, the flexible member 312 and any others. Finally, in the fourth step, the flexible member 206, the first liquid 204 and the second liquid 205 are arranged in the container.

Thus, the liquid lens 200 or 300 representing a desired surface accuracy $\alpha$ can be manufactured by way of the first through fourth steps without extremely reducing the density difference between the two liquids 204 and 205 arranged adjacent to the flexible member 206.

Now, several embodiments of manufacturing method including the first through fourth steps will be described below. As the first embodiment, a method of manufacturing a liquid lens to be used for a digital single-lens reflex camera will be described. As exemplar specifications of the liquid lens to be used for a digital single-lens reflex camera, the surface accuracy is determined to be as $2\lambda$ on the basis of the optical design specifications and the inner diameter of the liquid lens 200 or 300 is determined to be as 30 mm on the basis of the mechanical design specifications. This is the first step of this embodiment.

Next, the above specification values are made to substitute the above formula (1) to obtain formula (6) represented below.

$$\gamma \geq 1.72 \times \Delta\rho \qquad \text{formula (6)}$$

Then, the density difference $\Delta\rho$ of the liquids 204 and 205 arranged adjacent to the flexible member 206 and the elastic strain energy per unit area $\gamma$ of the flexible member 206 are determined so as to satisfy the requirement of the above formula (6). If, for example, $\Delta\rho$ is determined to be as 5 kg/m³ as a manufacturing condition, then $\gamma$ is determined to be not less than 8.6 N/m from the above formula (6). $\gamma$ may be determined to be as 9.0 N/m for example. Thus, the above-described operations are conducted in the second step of this embodiment. Then, in the third step, a liquid container having an inner diameter of 30 mm is prepared. The expression of inner diameter as used herein refers to the largest inner diameter of the part of the container for containing the first liquid 204 and the second liquid 205. In FIGS. 3 and 4, the container is formed by combining the cylindrical member 201, the closure members 202 and 203, the pumps 211 and 212, the flexible member 312 and any others. Finally, in the fourth step, the flexible member 206 representing the computationally determined value of $\gamma$, the first liquid 204 and the second liquid 205 are arranged in the container.

Thus, the liquid lens 200 or 300 representing a desired surface accuracy value of $2\lambda$ can be manufactured by way of the first through fourth steps without extremely reducing the density difference between the two liquids 204 and 205 arranged adjacent to the flexible member 206 (and making the density difference less than 1 kg/m³).

Now, as the second embodiment, a method of manufacturing a liquid lens to be used for a varifocal eyeglass will be described. As exemplar specifications of the liquid lens to be used for a varifocal eyeglass, the surface accuracy is determined to be as $10\lambda$ on the basis of the optical design specifications and the inner diameter of the liquid lens 200 or 300 is determined to be as 50 mm on the basis of the mechanical design specifications. This is the first step of this embodiment.

Next, the above specification values are made to substitute the above formula (1) to obtain formula (7) represented below.

$$\gamma \geq 1.95 \times \Delta\rho \qquad \text{formula (7)}$$

Then, the density difference $\Delta\rho$ of the liquids 204 and 205 arranged adjacent to the flexible member 206 and the elastic strain energy per unit area $\gamma$ of the flexible member 206 are determined so as to satisfy the requirement of the above formula (7). If, for example, $\Delta\rho$ is determined to be as 10 kg/m³ as a manufacturing condition, then $\gamma$ is determined to be not less than 19.5 N/m from the above formula (7). $\gamma$ may be determined to be as 20.0 N/m for example. Thus, the above-described operations are conducted in the second step of this embodiment.

Then, in the third step, a liquid container having an inner diameter of 50 mm is prepared. The meaning of the expression of inner diameter and the meaning of the expression of container as used herein are same as the ones described for the first embodiment. Finally, in the fourth step, the flexible member 206 representing the computationally determined value of $\gamma$, the first liquid 204 and the second liquid 205 are arranged in the container.

Thus, the liquid lens 200 or 300 representing a desired surface accuracy value of $10\lambda$ can be manufactured by way of the first through fourth steps without extremely reducing the density difference between the two liquids 204 and 205 arranged adjacent to the flexible member 206 (making the density difference less than 1 kg/m³).

Now, as the third embodiment, a method of manufacturing a liquid lens to be used for a car mounted camera will be described. As exemplar specifications of the liquid lens to be used for a car mounted camera, the surface accuracy is determined to be as $5\lambda$ on the basis of the optical design specifications and the inner diameter of the liquid lens 200 or 300 is determined to be as 20 mm on the basis of the mechanical design specifications. This is the first step of this embodiment.

Next, the above specification values are made to substitute the above formula (1) to obtain formula (8) represented below.

$$\gamma \geq 0.173 \times \Delta\rho \qquad \text{formula (8)}$$

Then, the density difference $\Delta\rho$ of the liquids 204 and 205 arranged adjacent to the flexible member 206 and the elastic strain energy per unit area $\gamma$ of the flexible member 206 are determined so as to satisfy the requirement of the above formula (8). If, for example, $\Delta\rho$ is determined to be not less than 15 kg/m$^3$ as a manufacturing condition, then $\gamma$ is determined to be not less 2.60 N/m from the above formula (8). $\gamma$ may be determined to be as 3.0 N/m for example. Thus, the above-described operations are conducted in the second step of this embodiment.

Then, in the third step, a liquid container having an inner diameter of 20 mm is prepared. The meaning of the expression of inner diameter and the meaning of the expression of container as used herein are same as the one described for the first embodiment. Finally, in the fourth step, the flexible member 206 representing the computationally determined value of $\gamma$, the first liquid 204 and the second liquid 205 are arranged in the container.

Thus, the liquid lens 200 or 300 representing a desired surface accuracy value of 5λ can be manufactured by way of the first through fourth steps without extremely reducing the density difference between the two liquids 204 and 205 arranged adjacent to the flexible member 206 (making the density difference less than 1 kg/m$^3$).

Now, as the fourth embodiment, a method of manufacturing a liquid lens to be used for a high precision digital camera will be described. As exemplar specifications of the liquid lens to be used for a high precision digital camera, the surface accuracy is determined to be as 1λ on the basis of the optical design specifications and the inner diameter of the liquid lens 200 or 300 is determined to be as 10 mm on the basis of the mechanical design specifications. This is the first step of this embodiment.

Next, the above specification values are made to substitute the above formula (1) to obtain formula (9) represented below.

$$\gamma \geq 0.0818 \times \Delta\rho \qquad \text{formula (9)}$$

Then, the density difference $\Delta\rho$ of the liquids 204 and 205 arranged adjacent to the flexible member 206 and the elastic strain energy per unit area $\gamma$ of the flexible member 206 are determined so as to satisfy the requirement of the above formula (9). If, for example, $\Delta\rho$ is determined to be not less than 5 kg/m$^3$ as a manufacturing condition, then $\gamma$ is determined to be not less 0.409 N/m from the above formula (9). $\gamma$ may be determined to be as 1.0 N/m for example. Thus, the above-described operations are conducted in the second step of this embodiment.

Then, in the third step, a liquid container having an inner diameter of 10 mm is prepared. The meaning of the expression of inner diameter and the meaning of the expression of container as used herein are same as the ones described for the first embodiment. Finally, in the fourth step, the flexible member 206 representing the computationally determined value of $\gamma$, the first liquid 204 and the second liquid 205 are arranged in the container.

Thus, the liquid lens 200 or 300 representing a desired surface accuracy value of 1λ can be manufactured by way of the first through fourth steps without extremely reducing the density difference between the two liquids 204 and 205 arranged adjacent to the flexible member 206 (making the density difference less than 1 kg/m$^3$).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-085961, filed Apr. 4, 2012, which is hereby incorporated by reference herein in its entirety.

REFERENCE SIGNS LIST

100: liquid lens
101: cylindrical member
102, 103: closure member
104: first liquid
105: second liquid
106: flexible member

The invention claimed is:

1. A liquid lens comprising two or more liquids arranged adjacent to each other in a container for containing the liquids with a flexible member interposed between them, at least a part of the flexible member functioning as refractive surface; the elastic strain energy per unit area Y[N/m] of the flexible member satisfying the requirement of formula (1) represented below;

$$\gamma \geq 5.16 \times 10^5 \times \Delta\rho \times \alpha^{-1} \times \phi^{3.4} \qquad \text{formula (1)},$$

where
$\Delta\rho$[kg/m$^3$] is the density difference between the two liquids arranged adjacent to the flexible member;
$\alpha$[λ] is the surface accuracy of the refractive surface; and
$\phi$[m] is the inner diameter of the liquid lens.

2. The liquid lens according to claim 1, wherein the surface accuracy $\alpha$[λ] is not greater than 10 λ.

3. The liquid lens according to claim 1, wherein the surface accuracy $\alpha$[λ] is not greater than 5 λ.

4. The liquid lens according to claim 1, wherein the surface accuracy $\alpha$[λ] is not greater than 2 λ.

5. The liquid lens according to claim 1, wherein the surface accuracy $\alpha$[λ] is not greater than 1 λ.

6. A method of manufacturing a liquid lens including two or more liquids arranged adjacent to each other with a flexible member interposed between them, at least a part of the flexible member functioning as refractive surface, the method comprising:
a step of determining the inner diameter $\phi$[m] of the liquid lens and the surface accuracy $\alpha$[λ] of the refractive surface;
a step of determining the density difference $\Delta\rho$[kg/m$^3$] between the two liquids to be arranged adjacent to the flexible member and the elastic strain energy per unit area $\gamma$[N/m] of the flexible member on the basis of the determined inner diameter $\phi$, the determined surface accuracy $\alpha$ and the formula (1) below;
a step of preparing a container having the above determined inner diameter $\phi$; and
a step of arranging the two or more liquids and the flexible member in the container, wherein $$\gamma \geq 5.16 \times 10^5 \times \Delta\rho \times \alpha^{-1} \times \phi^{3.4} \qquad \text{formula (1)}.$$

* * * * *